United States Patent [19]

Blake et al.

[11] Patent Number: 5,598,739
[45] Date of Patent: Feb. 4, 1997

[54] SELF-PROPELLED LINEAR MOTION DRIVE APPARATUS

[75] Inventors: Lawrence S. Blake, Peabody; Arthur J. Bellemore, Chelmsford; Ralph S. Hanseler, North Andover; David P. Viola, Andover, all of Mass.

[73] Assignee: Miles Inc., Wilmington, Mass.

[21] Appl. No.: 182,484

[22] Filed: Jan. 14, 1994

[51] Int. Cl.⁶ ........................ F16H 27/02
[52] U.S. Cl. ............ 74/89; 476/11; 105/77
[58] Field of Search ............ 74/89; 476/11; 318/615, 616, 618; 104/94; 105/77, 30, 155

[56] References Cited

U.S. PATENT DOCUMENTS

| | | | |
|---|---|---|---|
| 1,746,407 | 2/1930 | Schröter et al. | |
| 2,035,115 | 3/1936 | Earl | 105/77 |
| 2,198,928 | 4/1940 | Wehner | 105/77 |
| 3,184,662 | 5/1965 | Wallace | 318/618 |
| 3,922,970 | 12/1975 | Glastra | 104/91 |
| 4,233,740 | 11/1980 | Bunn et al. | 33/1 A |
| 4,274,038 | 6/1981 | Sawyer | 74/89 |
| 4,378,709 | 4/1983 | Chitayat | 74/89 |
| 4,430,606 | 2/1984 | Otsuki et al. | 318/616 |
| 4,442,390 | 4/1984 | Davis | 74/89 |
| 4,444,069 | 4/1984 | Dangschat | |
| 4,633,423 | 12/1986 | Bailey | 318/618 |
| 4,816,847 | 3/1989 | Pavone | |
| 4,963,217 | 10/1990 | Pavone | |
| 5,040,427 | 8/1991 | Tanita et al. | |
| 5,197,343 | 3/1993 | Rochte | 74/89 |
| 5,357,819 | 10/1994 | Takei | 74/89 |

FOREIGN PATENT DOCUMENTS 1185115  3/1970  United Kingdom.

Primary Examiner—Rodney H. Bonick
Assistant Examiner—David Fenstermacher
Attorney, Agent, or Firm—John A. Merecki

[57] ABSTRACT

A linear motion drive apparatus uses a friction drive wheel to drive a carriage along two rails. The drive shaft of the friction wheel is supported by the carriage, and has a rotor of a pancake motor and an inertia wheel non-rotatably attached thereto. The stator is fixed to a wall of the carriage. The carriage is supported by recirculating ball bearings which are arranged with permanent magnets to urge the friction wheel into engagement with the flat rail. A slip detection and correction system has first encoder mounted on the drive shaft to produce a signal representing the rotational position of the shaft, and a second encoder mounted on the carriage to produce a signal representing the position of the carriage with respect to the rails. The motor is responsive to the signals to compensate for detected slippage.

6 Claims, 5 Drawing Sheets

SELF-PROPELLED LINEAR MOTION DRIVE APPARATUS

This application is related to co-pending application of Lawrence S. Blake, Arthur J. Bellemore, Ralph S. Hanseler and David P. Viola for Scanning Apparatus With Self-Propelled Linear Motion Carriage, Ser. No. 08/182,488 filed on Jan. 14, 1994 and co-pending application of David P. Viola and Lawrence S. Blake for Support For A Self-Propelled Linear Motion Drive Apparatus, Ser. No. 08/182, 602 filed on Jan. 14, 1994.

BACKGROUND OF THE INVENTION

The present invention relates to a low friction servo controlled precision linear motion drive apparatus and in particular, a precision linear motion drive which converts rotary motion into linear motion and for use in apparatus for image recording, scanning, or measuring.

In certain image scanning devices, an image is scanned in two dimensions by a linear motion system traveling linearly along a slow scan axis of an imaging device, while a scanning device scans the image along a fast scan axis perpendicular to the slow scan axis. Such an imaging system requires precise synchronization between the slow scan axis motion and fast scan axis scanning and may also require that the synchronization be maintained for both forward and backward slow scan travel. It is necessary to minimize positional errors which result in imaging errors due to slippage or backlash of the drive elements and mechanical resonance which may occur during scanning. In addition, velocity errors due to various electrical and mechanical system resonance, slippage, or friction and drag variations, must also be minimized. Furthermore, since an image scanning linear motion system travels on an axis parallel to the slow scan axis of the image to be scanned, as well as perpendicular to the fast scan axis, it is advantageous for the axis of linear motion to be accurate and straight.

An example of a scanning mechanism of this type, disclosed in U.S. Pat. No. 1,746,407, has a cylindrical inner surface on which light is scanned upon by a beam deflector mounted on a rotating shaft. The cylindrical surface is moved linearly in a slide type of guide relative to the beam deflector mounted on the rotating shaft. This type of linear drive requires an operating space twice the length of the cylinder, due to the cylinder being driven linearly relative to the beam deflector.

Another linear motion drive apparatus is disclosed in U.K. Patent No. 1,185,115, in which a carriage is moved linearly inside of a cylindrical drum by a rotating screw engaging a nut assembled in the carriage. The drive requires few parts as the carriage is guided by a longitudinal slot in the cylinder, however the slot limits the usable scanning area. The screw is rotated by a motor mounted outside of the cylinder. Because of the precise accuracy demanded in image scanning apparatuses, the lead screw of such a system must be machined with particular tolerances, proving to be a costly process. The mass, inertia, and high friction of the lead screw require additional motor power to be driven at the required speeds, which further increases costs.

Another embodiment shown in the same reference uses a belt connected to the carriage to pull the carriage linearly inside the length of the cylinder. The belt is driven by means of pulleys mounted externally of the cylinder at the two ends of the cylinder. The pulleys are driven by an auxiliary motor. The carriage is supported by guide rollers which are in contact with the inner surface of the cylinder and which center the axis of linear motion with the axis of the cylinder. A longitudinal guide is provided to prevent the carriage from rotating relative to the cylinder. Both of these embodiments have motors and other elements of the drive systems mounted externally of the cylinder, requiring valuable space within the imaging system.

Accordingly, it is an object of the present invention to provide a linear motion drive apparatus mounted on a carriage of a linear transport system, thereby propelling the carriage independently of external drive elements and requiring minimal operating space substantially equal to the length of the slow scan axis.

Yet, another object of the present invention is to provide a friction drive means on a slow scan axis of travel and to control the drive means with a precision servo feedback system.

SUMMARY OF THE INVENTION

According to the present invention, a self-propelled linear motion drive apparatus comprises a fixed base, a carriage movably supported on the fixed base, a drive system mounted on the carriage, for driving the carriage relative to the fixed base, including a friction wheel drivingly engaged with the fixed base and urged into driving contact with the fixed base, a support system for movably supporting the carriage with respect to the fixed base, an anti-rotation component for preventing rotation of the carriage with respect to the fixed base, and a guide for guiding the carriage along the fixed base in a linear path, and wherein the drive system includes a shaft rotatably supported by the carriage and the friction wheel mounted to the shaft.

BRIEF DESCRIPTION OF THE DRAWINGS

The features and objects of the invention will become apparent in the following description when taken with the accompanying drawings, in which.

DETAILED DESCRIPTION OF THE INVENTION

Figure 1:
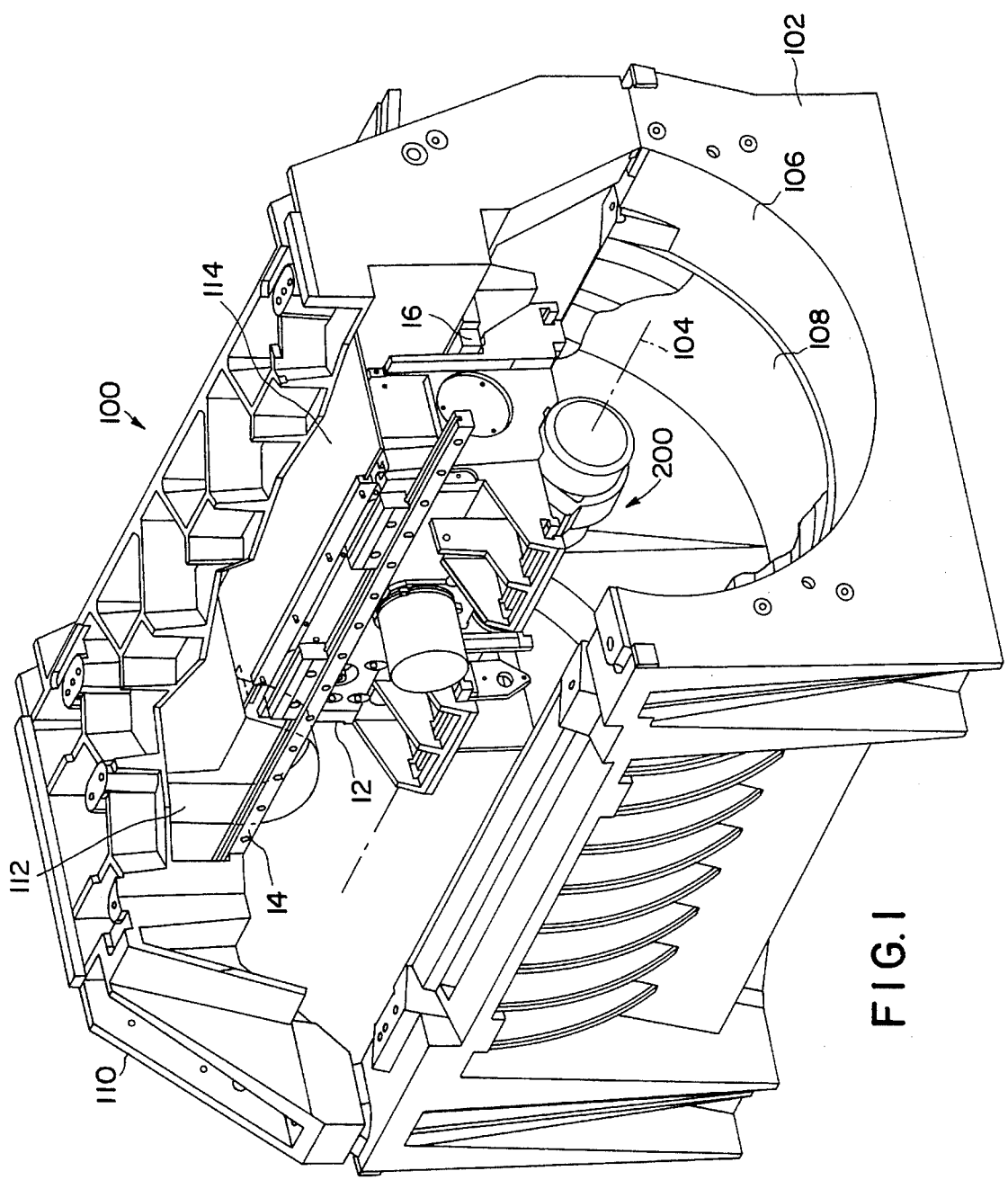
FIG. 1 is an isometric view showing a portion of an internal drum scanner apparatus according to the present invention.

Referring now to FIG. 1, a scanning apparatus generally indicated by reference numeral 100 comprises an internal drum 102 in the form of a partial cylinder having a longitudinal axis 104 and a support surface 106 on which an object to be scanned 108 is secured for scanning. The drum 102 further serves as a structural base, supporting an upper support structure 110. A movable carriage 12, movably suspended by support and guide rails 14 and 16, attached to upper structure 110, moves along a linear motion axis defined by the rails 14, 16, which are made parallel with drum axis 104 by alignment of upper structure 110 with drum 102 at assembly. A wire harness 112, connects at its first end to the carriage 12 and at its other end to a scanner controller (not shown) for supplying electrical power to electronic components attached to the carriage 12 and for passing electronic signals between electronic components attached to the carriage 12 and the scanner controller. The wire harness 112 moves with the carriage 12 being fully extended at the first end of travel of the carriage 12 and forming a slack loop when carriage 12 is at the other end of travel.

Figure 2:
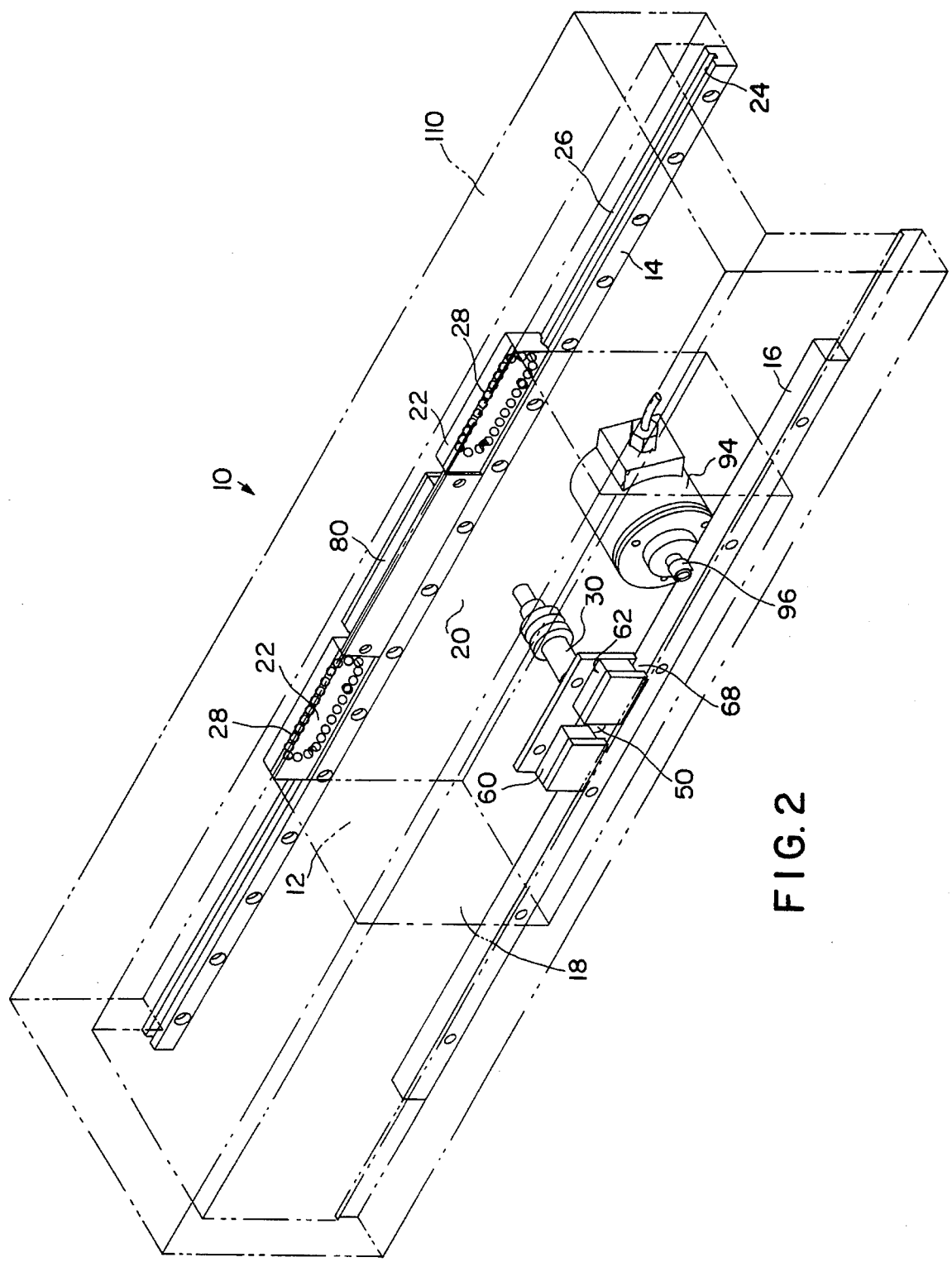
FIG. 2 is an isometric view of the guide and support elements along which the self-propelled carriage of FIG. 1 is propelled.

Referring now to FIG. 2, a linear motion drive apparatus, generally indicated by reference numeral 10, drives the carriage 12 (shown dashed) along the two guide rails 14, 16 supported over their entire length by the upper support structure 110 (shown dashed). The carriage 12, generally rectangular in form, has guide rail 16 along longitudinal side wall 18 and guide rail 14 along longitudinal side wall 20 of the carriage 12 to provide stabilization. The carriage 12 is supported for linear movement along the guide rails 14, 16 by two recirculating ball bearings 22 that allow the carriage 12 to move along the rails with minimal friction. Rail 14 has a V-groove 24 in a top side 26 thereof to accommodate balls 28 of the recirculating ball bearings 22. The bearings 22 are attached to the exterior of the side wall 20 of the carriage 12 and are spaced apart along the V-grooved rail 14 to prevent rotation of the carriage 12 relative to the guide rails 14, 16. The low friction rolling contact interface of the carriage with the support and guide rails of the present invention allows smooth uniform carriage motion substantially reducing the drive torque required to move the carriage along the motion axis when compared with the lead screw and friction slide linear drives of the prior art.

Figure 3:
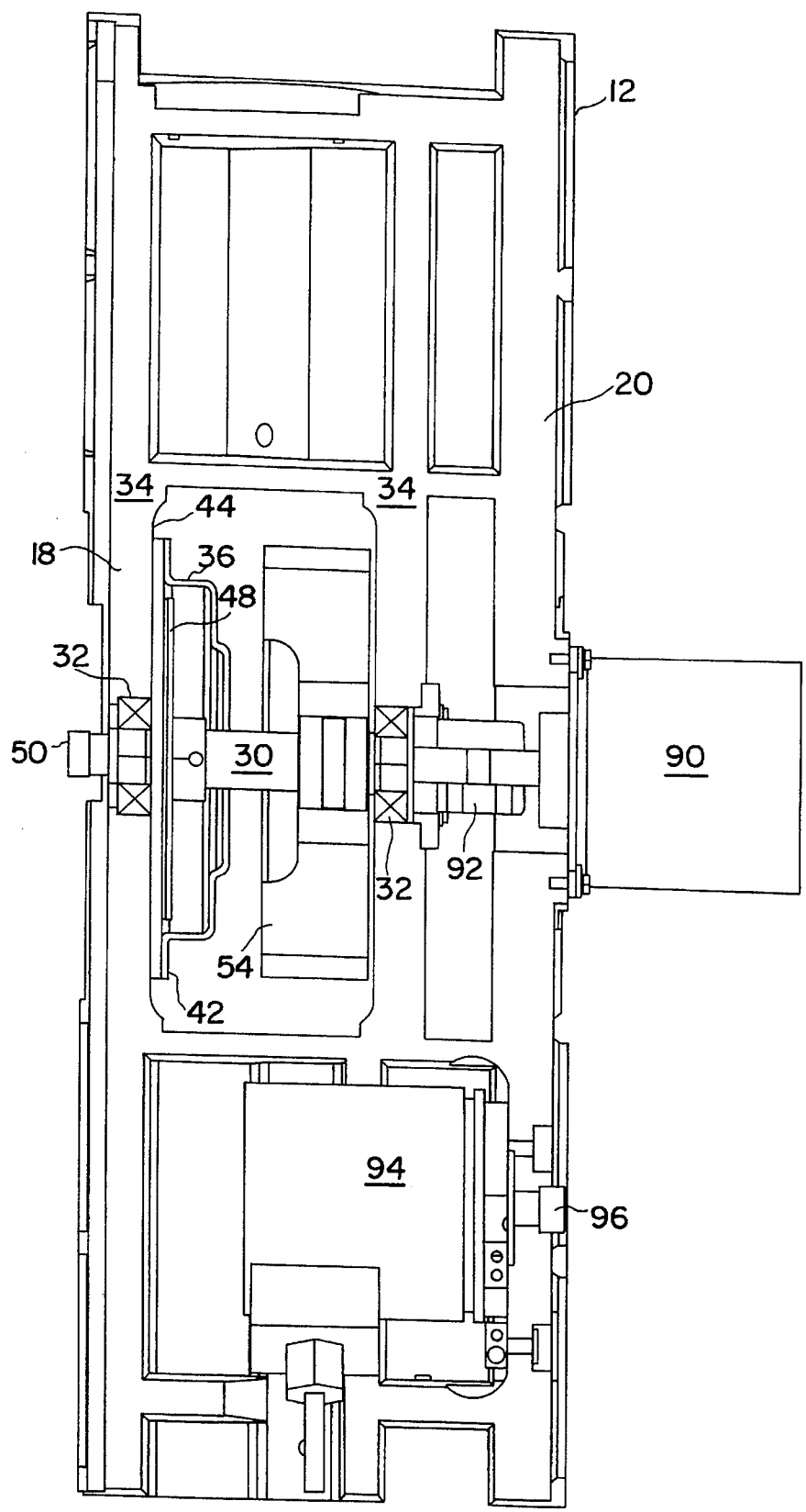
FIG. 3 is a bottom view of the self-propelled carriage apparatus according to the present invention.

Shown in FIG. 3, a drive shaft 30 is supported for rotation by two ball bearings 32 mounted in interior walls 34 of the carriage 12. A "pancake" DC motor 36 is mounted on the carriage 12 to rotate the drive shaft 30. Near one end of the drive shaft 30, a stator motor housing 42 is fixed to an inner portion 44 of the side wall 18, and a rotor 48 is fixed to the drive shaft 30 for rotation therewith. Integral with the same end of the drive shaft 30 is a friction wheel 50 in contact with the flat rail 16, to drive the cartage 12 along the rails 14, 16 upon rotation of the drive shaft 30. Near the center of the drive shaft 30, an inertia wheel 54 is fixed to the drive shaft 30 for rotation therewith to provide rotational inertia and to minimize carriage velocity disturbances due to possible motor torque ripple and transport friction variations.

Figure 4:
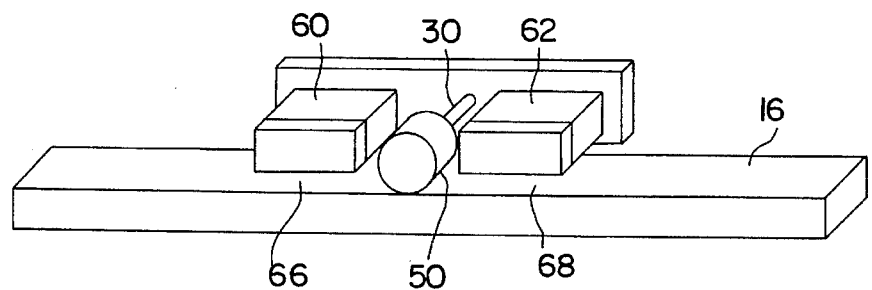
FIG. 4 is a diagrammatic view showing magnetic loading elements of the carriage of FIG. 2 against support guide elements of FIG. 3.

Referring now to FIGS. 2 and 4, two permanent magnets 60, 62 are fixed to an outer portion of the side wall 18 of the carriage 12, one on each side of the friction wheel 50. Air gaps 66, 68 are located between each magnet 60, 62 respectively, and the flat rail 16, which can have a ferromagnetic member integral therewith or can be constructed of ferromagnetic material. A magnetic attraction between the magnets 60, 62 and the flat rail 16 urges the friction wheel 50 into frictional engagement with the flat rail 16, providing a firm contact between the friction wheel 50 and the flat rail 16, thereby minimizing slip. Additionally, frictional contact is maintained between the friction wheel 50 and the flat rail 16 by the gravity load of the carriage 12 when mounted as in FIG. 1, however the gravity load is small compared to the magnetic force, and the magnetic loading is sufficient to enable vertical mounting and linear movement in addition to horizontal.

Referring now to FIG. 2, on the opposite side wall 20 of the carriage 12, a large magnet 80 is interposed between the two spaced recirculating ball bearings 22. An air gap (not shown) is located between the large magnet 80 and the V-grooved rail 14, which also has a ferromagnetic portion like the flat rail as described in the preceding paragraph. The air gap is substantially identical to the air gaps 66, 68 for the magnets 60, 62 shown and described for the flat rail 16 mounting. The large magnet 80 urges the recirculating ball bearings 22 into the V-grooved rail 14. The magnitude of the magnetic load between the magnets 60, 62 and 80 and the rails 14, 16 can be adjusted by changing the width of the air gap by adjusting the mounting position of each magnet with respect to the carriage wall 18 or 20.

Figure 5:
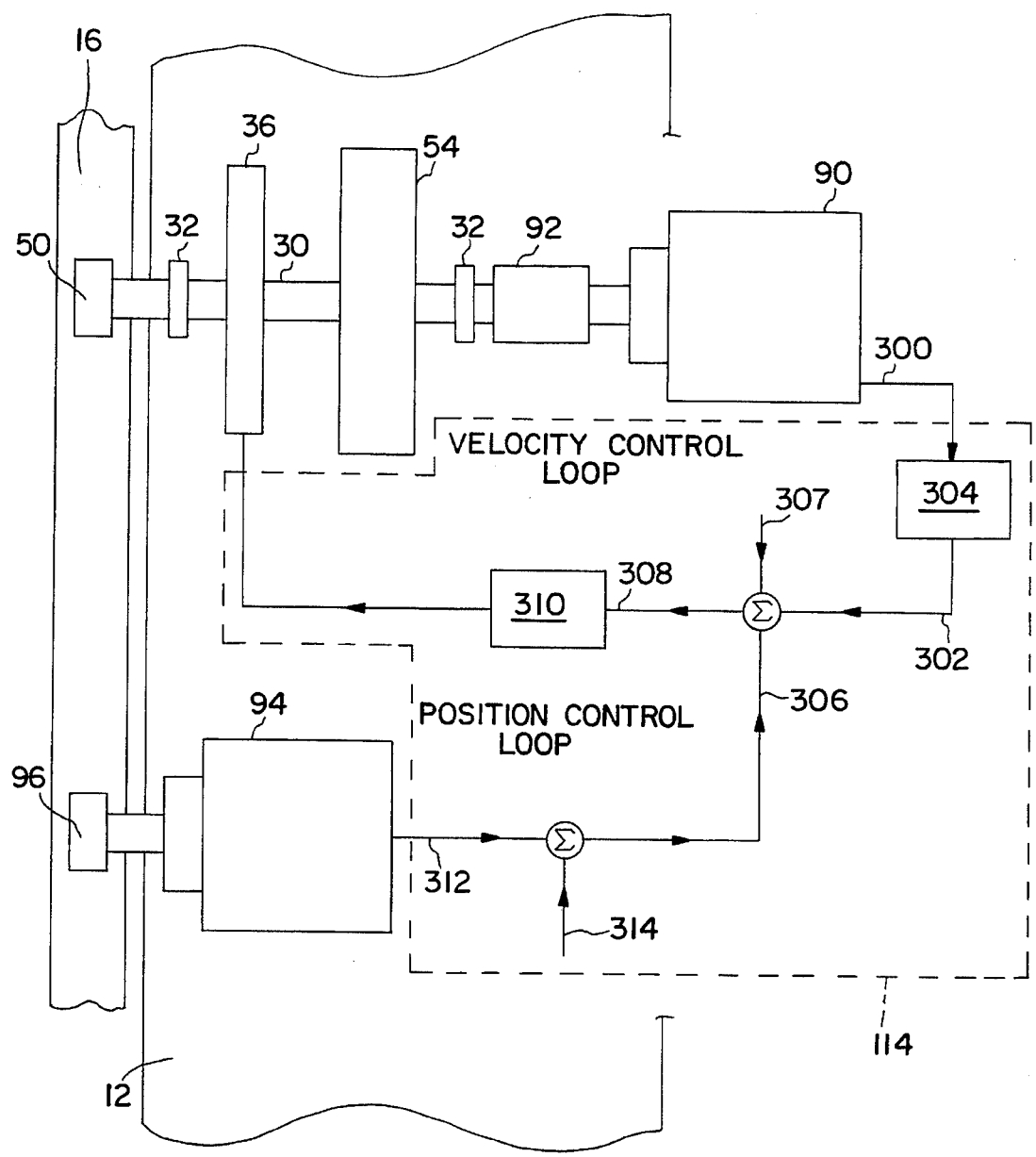
FIG. 5 is a diagrammatic view of a control system employed by the present invention.

Referring now to FIG. 5, a first precision rotary encoder 90 is directly coupled to drive shaft 30 via coupling 92 and generates an electrical signal 300 representative of the angular position of the DC motor 36 as well as attached drive shaft 30 and friction wheel 50. A motor driver controller PC board 114 attached to the carriage 12 is an integral part of a conventional velocity control loop for monitoring and correcting the angular velocity of DC motor 36. The controller board 114 receives the electrical signal 300 from the first encoder 90 for processing at signal processor 304. The signal 300 from the first encoder 90 is converted from a position signal to velocity signal 302 proportional to the carriage velocity by the signal processor 304. Velocity signal 302 is then summed with a position error signal 306, as well as with a desired velocity signal 307, both described below, forming an error velocity signal 308 which is amplified by power amplifier 310 which in rum accelerates or decelerates the DC motor 36 in a manner that minimizes the velocity error of the DC motor 36 in accordance with the error velocity signal 308.

A second rotary encoder 94 is mounted to the carriage 12 and has a wheel 96 riding along one of the rails 14, 16. The second encoder 94 generates an electrical signal 312 representative of the angular position of wheel 96 with respect to the rails 14, 16. The signal 312 from the second encoder 94 is processed by controller board 114 such that a conventional position control loop for monitoring and correcting the angular position of DC motor 36 with respect to a desired angular position is provided. The controller board 114 receives the electrical signal 312 from the second encoder 94 and sums it with a desired position signal 314 which is derived from the position of a third encoder, to be described in a later section, but could be any desired position signal. The position signal 314 may be time varying, in which case the position loop, effectively becomes a phase lock loop. The resultant sum provides the position error signal 306 which modifies the velocity of DC motor 36 as described above.

By continuous sampling of the encoder signals 300 and 312, controller board 114 continually compensates for velocity and position errors of the carriage 12 with respect to the rails 14, 16.

The second rotary encoder 94 is shown with its wheel 96 mounted against the flat rail 16 in FIG. 2 and with its wheel 96 facing the opposite side 20 of the carriage 12 for mounting against the V-grooved rail 14 in FIG. 3. It is noted that the wheel 96 of the second encoder 94 can be mounted to ride along either of the two guide rails 14, 16 or along any stationary surface to track the actual movement of the carriage 12 along any fixed base.

The described self-propelled drive system does not require the use of two rotary encoder 90 and 94, since the single encoder 90 can be used to provide both position and velocity feedback. It is possible to provide a combined velocity and position control loop from a single encoder signal. The present embodiment offers the advantage that, micro-slip, which is known to occur in friction drives between friction drive wheel 50 and rail 16, is compensated for by monitoring the actual position with the encoder 94 and its wheel 96. Furthermore, the carriage 12 can be guided and supported by equivalent means other than those shown in the present embodiment or to substitute equivalent position feedback devices, e.g. a linear encoder or inter-ferometric device, for encoder 94 to measure the actual linear position of the carriage 12 with respected to a stationary fixed base.

Figure 6:
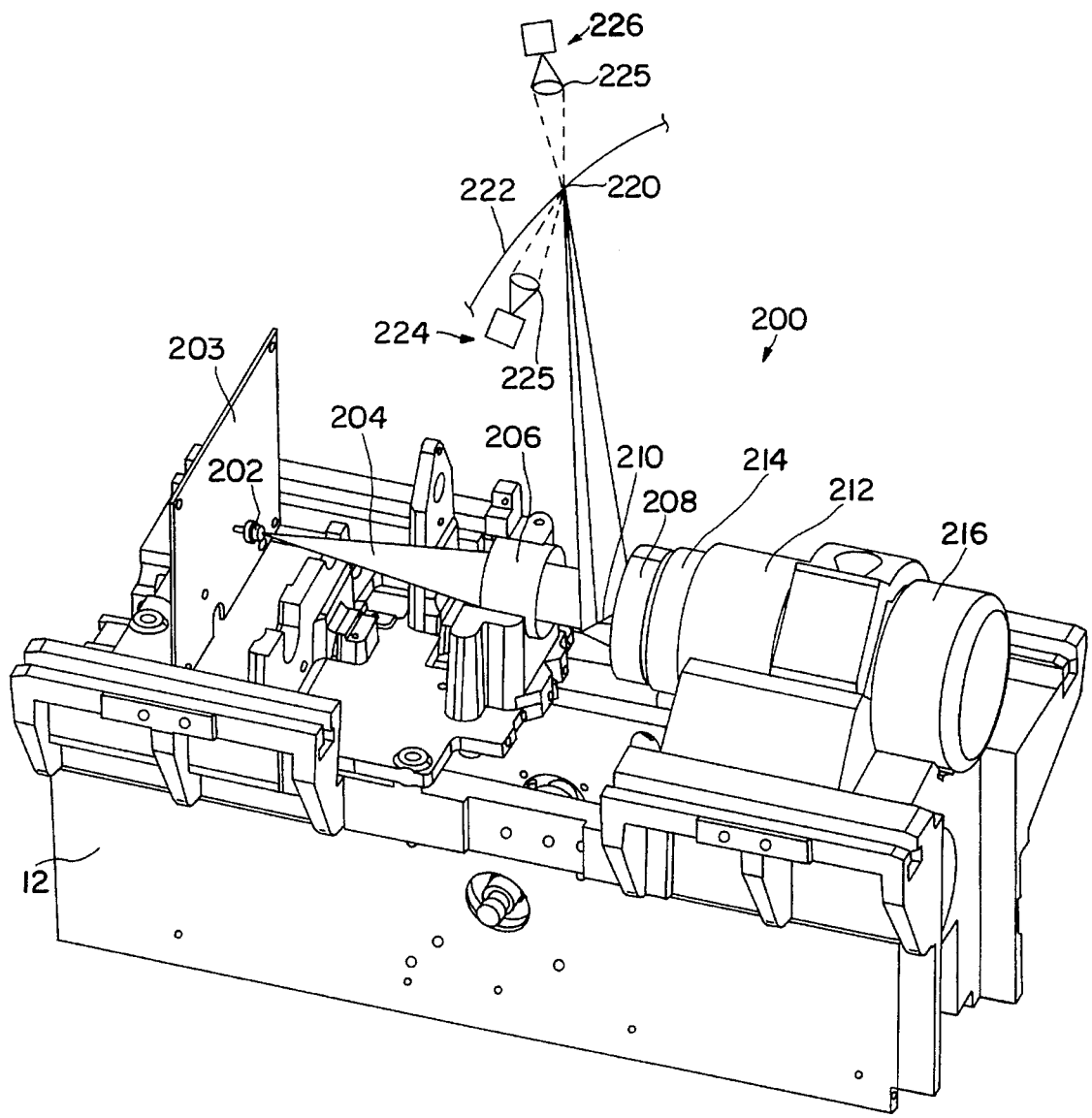
FIG. 6 is an isometric view of an optical scanning apparatus mounted to the carriage of FIG. 2.

Referring now to FIG. 6, a radiation beam scanning apparatus, indicated generally by reference numeral 200 is attached to the carriage 12. A beam scanning apparatus in general, only requires a radiation beam source and a rotating deflector element to perform a scanning function i.e. to deflect a radiation beam through a range of angles in a sweeping motion. In this embodiment of the invention, the radiation beam scanning apparatus 200 is specifically for scanning an image to be recorded. A laser diode 202 which is controlled and driven by a laser current driver PC board 203 provides a point electro-magnetic radiation source for generating a diverging beam 204. The laser diode 202 and laser driver board 203 are each attached to the carriage 12 and the driver 203 is in communication with the motor driver controller board 114 (FIG. 1) for sending and receiving electrical signals. The laser driver board 203 provides a driver current for driving and modulating the laser diode 202 in synchronization with the motion of the carriage 12, and in accordance with an information signal, described in a later section.

The beam 204 is collected and shaped by a lens 206 while passing therethrough to a spin mirror 208 which reflects the beam through a substantially 85° angle toward the surface of the object 108 (FIG. 1) to be scanned at the surface of the drum 102. The lens 206 focuses the diverging beam 204 to a fine spot at the surface of the object 108 to be scanned, which in a preferred embodiment of the invention, is an image recording substrate such as photosensitive recording media like film, paper or plate material, and upon which an image is recorded by the radiation beam scanning apparatus.

It will be appreciated that the configuration of the lens 206 being positioned between the radiation beam source 202 and the rotating reflector 210 produces a curved field scan. Alternatively, the lens 206 can be positioned between the rotating deflector and the scanned object 108 to produce a flat field scan line. In this case, the object 108 is positioned on a flat supporting surface (not shown).

In an alternative embodiment when a radiation beam scanning apparatus is used for probing an object to be scanned to determine some characteristic of the object by collecting energy reflected from or energy which passes through the object to be scanned, a radiation beam detector is placed in a position for collecting some of the energy reflecting from or passing through the scanned object. Although such an embodiment is more typically used in a flat field scanning apparatus, FIG. 6 diagramatically details a radiation beam detector 224 for collecting energy reflected from an object to be scanned, and radiation beam deflector 226 for collecting energy passing through an object to be scanned. In each case lens 225 collects energy to focus it onto the surface of the radiation detectors 224, 226. It will be appreciated that detectors 224, 226 could replaced by an image recording material responsive to a radiation beam such that an image representative of the object to be scanned is recorded.

The spin mirror 208 provides a planar reflective surface 210, for reflecting the beam 204, and is attached to spin motor 212 at the first end of a motor shaft 214, for rotation thereby. A precision rotary encoder 216 attaches to the second end of shaft 214 for providing an electrical signal representative of the angular position of shaft 214 and the attached spin mirror 208. The signal from encoder 216 is received by the controller board 114 and is scaled to generate the desired position signal 314 thereby synchronizing the spinner angular position with the position of carriage 12.

The optical scanning apparatus 200 provides a focused laser spot 220 at the surface of the object 108 to be scanned. The laser spot 220 has a substantially round shape and a diameter which is a function of the laser diode 202 and the lens 206. Upon rotation of the spin mirror 208, the focused spot 204 sweeps out a scan line 222, substantially perpendicular to the axis of rotation of the mirror 208. By adjustment of the position of spin motor 212 with respect to rails 14, 16 at assembly, the rotation axis of spin mirror 208 is located substantially coincident with the longitudinal axis 104 of the drum 102 and substantially parallel with the travel axis of carriage 12. This provides that the scan line 222 is essentially perpendicular to the drum axis 104.

By translating the carriage 12 along the rails 14, 16 at a ram substantially equivalent to one diameter of laser spot 220 per revolution of spin mirror 208, a two dimensional scan of the object to be scanned 108 is provided at a resolution substantially equal to the diameter of spot 220. As described above, the synchronization of the spin motor 212, the DC motor 36 and any modulation of the laser diode 202 is maintained by the driver controller board 114 which is mounted on the carriage 12.

The laser diode 202 and thus the laser spot 220 am modulated in accordance with an information signal representing an image to be recorded onto the image recording substrate of the object to be scanned 108. The beam energy is modulated above and below a recording energy threshold of the image recording substrate in order to record an image pixel when the beam energy is above the recording energy threshold, and to not record an image pixel when the beam energy is below the recording energy threshold. The modulation is controlled through the driver controller board 114 which receives the information signal for modulation by convention means.

While this invention has been described in terms of various preferred embodiments, those skilled in the art will appreciate that various modifications, substitutions, omissions and changes may be made without departing from the spirit thereof including the use of any radiation scanning device for scanning any form of object to be scanned. Accordingly, it is intended that the scope of the present invention be limited solely by the scope of the following claims, including equivalents thereof.

What we claim and desire to secure by Letters of Patent of the United States are the following:

1. A linear motion drive apparatus comprising:

(a) a fixed base;

(b) movable carriage means for movement along a linear motion axis;

(c) linear motion drive means including electronic controller means, carried by said movable carriage means, for moving said movable carriage means along said linear motion axis with respect to said fixed base;

(d) support means fixedly mounted to said fixed base for movably supporting said movable carriage means with respect to said fixed base and for guiding said movable carriage means along said linear motion axis;

(e) friction wheel means rotatably driven by said linear motion drive means and in driving contact with said support means for moving said movable carriage means along said linear motion axis in response to rotation of said friction wheel means; and, (f) means for urging said friction wheel means into driving contact with said support means.

2. The apparatus of claim 1 wherein said linear motion drive means comprises:

(a) a drive shaft supported for rotation with respect to said movable carriage means wherein said friction wheel means is mechanically coupled to said drive shaft for rotation therewith; and, (b) DC motor means mounted to said movable carriage means and to said drive shaft for rotating said drive shaft and said friction wheel means.

3. The apparatus of claim 2 further comprising:

(a) an inertia flywheel fixed to said drive shaft for rotation therewith;

(b) first rotary encoder means mounted for rotation with said friction wheel means for providing a first electric signal representative of the position of said movable carriage means with respect to said fixed base;

(c) velocity feedback means, included within said electronic controller means, for receiving said first electric signal and for determining the velocity of said movable carriage means with respect to said fixed base; and (d) DC motor controller means, included within said electronic controller means and responsive to said first electric signal and velocity feedback means, for adjusting the rotational velocity of said DC motor means according to a desired linear velocity and a desired position of said movable carriage means with respect to said fixed base.

4. The apparatus of claim 2 further comprising:

(a) means for providing an electrical signal representative of an actual position of said movable carriage means with respect to said fixed base;

(b) means for providing an electrical signal representative of an actual velocity of said movable carriage means with respect to said fixed base;

(c) an electrical signal representative of a desired position of said movable carriage means with respect to said fixed base;

(d) an electrical signal representative of a desired velocity of said movable carriage means with respect to said fixed base; and, (e) electronic controller means for driving said DC motor to minimize errors between said actual position and said desired position and to minimizes errors between said actual velocity and said desired velocity.

5. A linear motion drive apparatus comprising:

(a) a fixed base;

(b) movable carriage means for movement along a linear motion axis;

(c) support means mounted to said fixed base for movably supporting said movable carriage means with respect to said fixed base and for guiding said movable carriage means along said linear motion axis;

(d) linear motion drive means, including DC motor means mounted to said movable carriage means and coupled to a friction wheel means maintained in driving contact with said support means, for moving said movable carriage means along said linear motion axis in response to rotation of said friction wheel means;

(e) first rotary encoder means mounted for rotation with said friction wheel means for providing an electric signal representative of an actual velocity of said movable carriage means with respect to said fixed base;

(f) second rotary encoder means, mounted for rotation with a wheel riding along said support means, for providing an electric signal representative of an actual position of said movable carriage means with respect to said fixed base; and, (g) electronic controller means mounted to said movable carriage means for driving said DC motor means to minimize errors between said actual position and a desired position and to minimize errors between said actual velocity and a desired velocity.

6. The linear motion drive apparatus according to claim 5 wherein said desired position and said desired velocity are provided to said electronic controller means in the form of first and second electrical signals.

* * * * *